No. 786,773. PATENTED APR. 4, 1905.
H. E. MARSH.
BRIQUET MACHINE.
APPLICATION FILED JUNE 2, 1904.
5 SHEETS—SHEET 3.
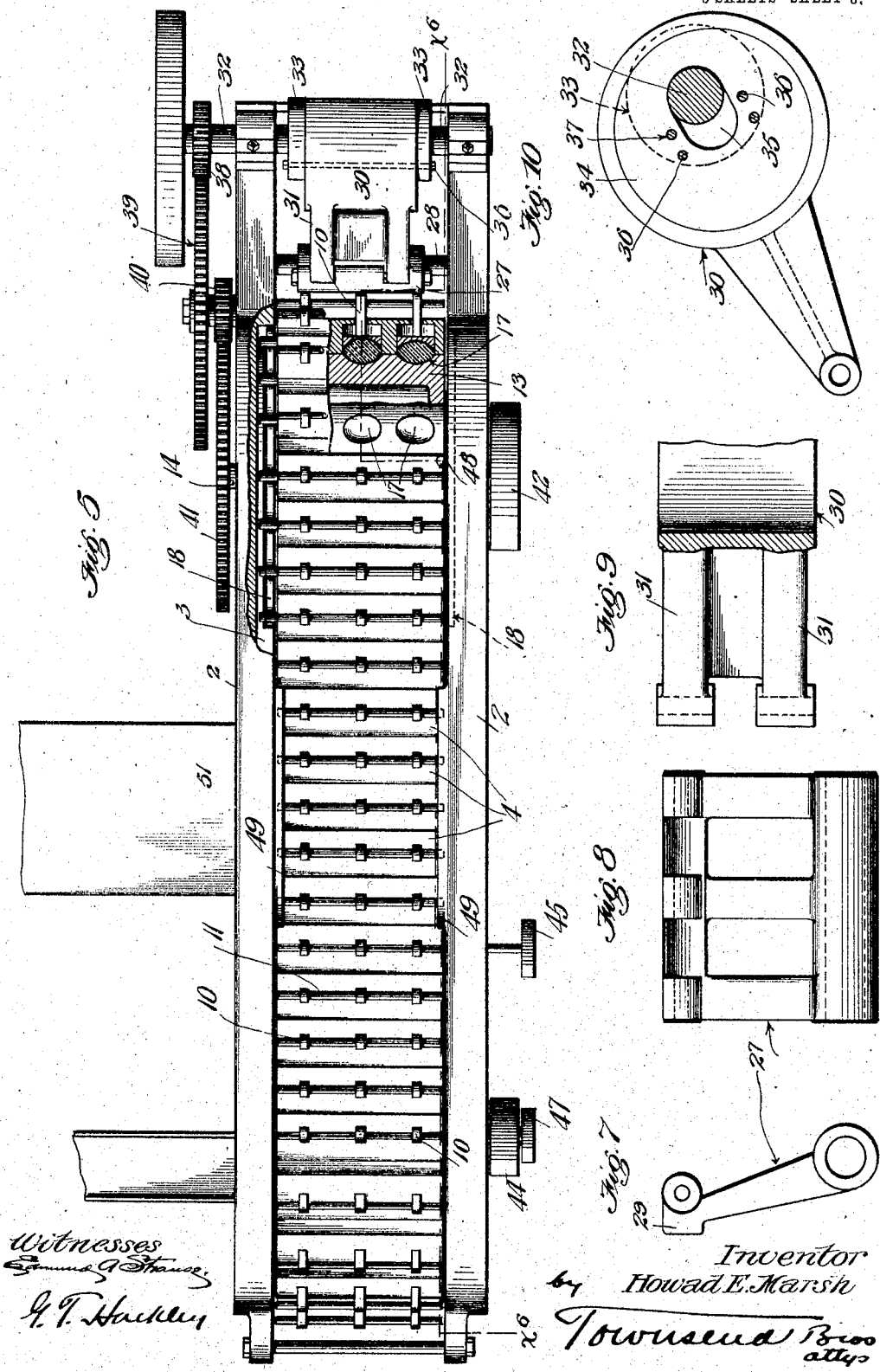
Witnesses
Inventor
Howard E. Marsh
by Townsend Bros
attys No. 786,773. PATENTED APR. 4, 1905.
H. E. MARSH.
BRIQUET MACHINE.
APPLICATION FILED JUNE 2, 1904.
5 SHEETS—SHEET 4.
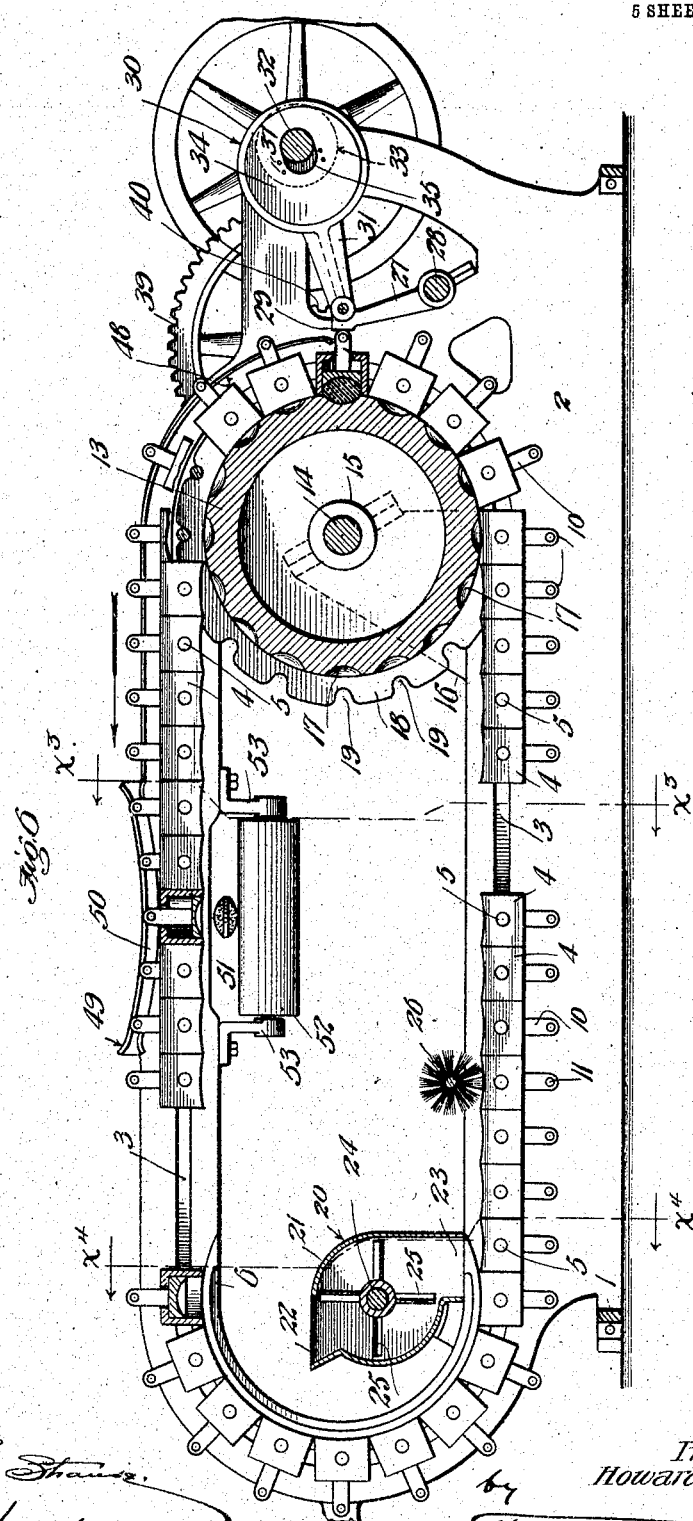
Witnesses
Inventor
Howard E. Marsh
by Townsend Bro.
atty.

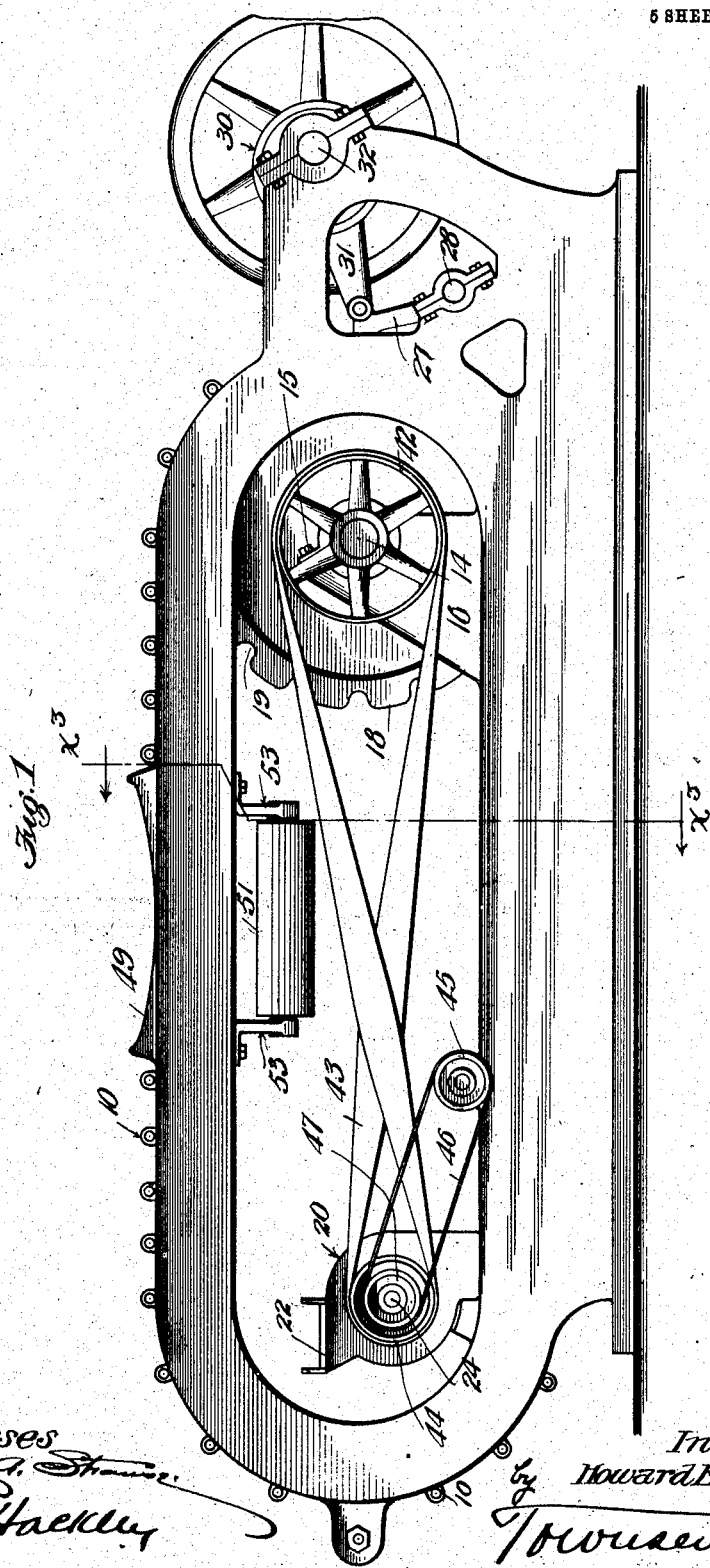

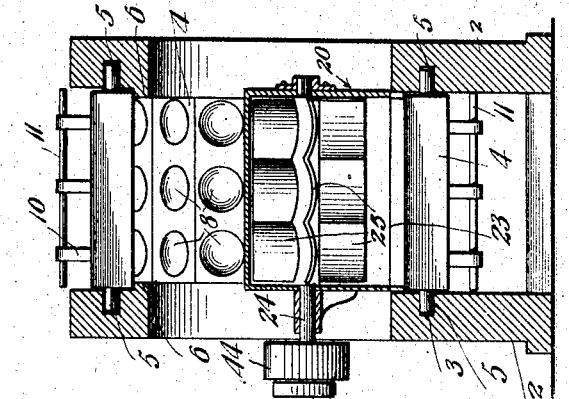

No. 786,773. PATENTED APR. 4, 1905.
H. E. MARSH.
BRIQUET MACHINE.
APPLICATION FILED JUNE 2, 1904.

6 SHEETS—SHEET 5.

Witnesses
Inventor
Howard E. Marsh
by Townsend Bros.
attys

No. 786,773.

Patented April 4, 1905.

UNITED STATES PATENT OFFICE.

HOWARD E. MARSH, OF LOS ANGELES, CALIFORNIA, ASSIGNOR OF ONE-HALF TO WILLIAM P. WAGY, OF LOS ANGELES, CALIFORNIA.

BRIQUET-MACHINE.

SPECIFICATION forming part of Letters Patent No. 786,773, dated April 4, 1905.

Application filed June 2, 1904. Serial No. 210,768.

*To all whom it may concern:*

Be it known that I, HOWARD E. MARSH, a citizen of the United States, residing at Los Angeles, in the county of Los Angeles and State of California, have invented a new and useful Briquet-Machine, of which the following is a specification.

This invention relates to a machine for forming briquets from various materials in desired forms; and the main object of the invention is to provide a machine of the character described which carries out its various functions by positively-operating mechanism, no chains or springs being employed, which are liable to stretch and impair the usefulness of the machine.

Another object is to provide a novel construction for feeding molds in succession in a definite orbit past the compressing device—a construction which insures a positive and exact synchronism between the compressing device and the traveling molds.

Another object is to provide a novel and effective compressing device which is adjustable to alter its stroke.

Another object is to provide a novel device for feeding material to the molds and to provide means for removing surplus material from the molds after they have been charged by the feeder.

Another object is to provide a novel means for positively retracting the mold-plungers and for retaining the briquets in the molds after the formation of the briquets and before their ejection.

Another object is to provide means for ejecting the briquets from the molds by compressed air with a construction which is extremely simple and effective, whereby an air-cushion is formed between the briquet and ejecting device, which prevents abrasion of the briquet by the ejecting device and which expels the briquet when its pressure rises to a certain point.

Other objects and advantages will appear from the following description.

Figure 11:
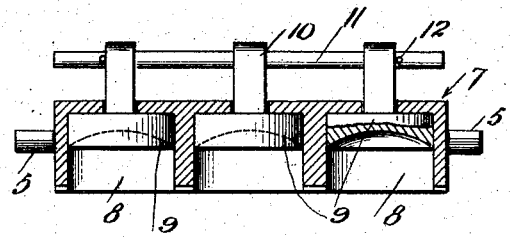
Figure 12:
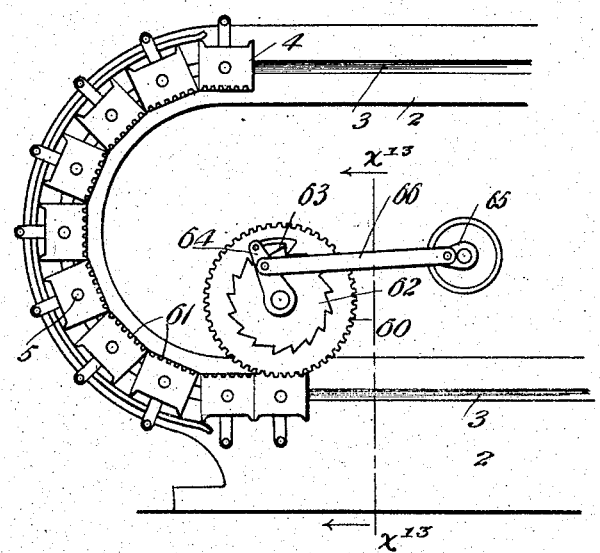
Figure 13:
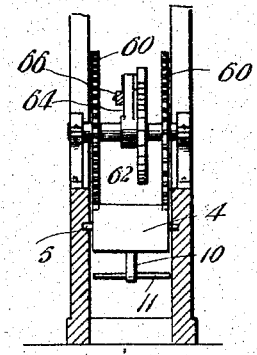

The accompanying drawings illustrate the invention, and referring thereto Figure 1 is a side elevation of the machine. Fig. 2 is an elevation of the compressing end of the machine. Fig. 3 is a transverse vertical section taken on line $x^3 x^3$ of Fig. 1. Fig. 4 is a transverse vertical section taken on line $x^4 x^4$ of Fig. 6. Fig. 5 is a plan view of the machine. Fig. 6 is a longitudinal vertical section taken on line $x^6 x^6$ of Fig. 5. Fig. 7 is a side elevation of the compressing-platen. Fig. 8 is a rear elevation of the compressing-platen. Fig. 9 is a plan view, with a portion broken away, of the eccentric-rod. Fig. 10 is a side elevation of the eccentric-shaft, eccentric, and eccentric-rod. Fig. 11 is a detail view in section taken longitudinally through a mold-block. Fig. 12 is a longitudinal vertical sectional view showing another form of construction, in which the mold-blocks are driven intermittently. Fig. 13 is a section on line $x^{13} x^{13}$ of Fig. 12.

1 designates a base upon which are mounted standards 2. Each standard 2 is provided with an elliptical groove 3. A series of mold-blocks 4 is provided, (see detail of Fig. 11,) which travel in an elliptical groove and are held in place by trunnions 5, which project from each end of each mold-block, the trunnions 5 sliding in the elliptical grooves 3. The bottom face of each mold-block is concave, the degree of curvature coinciding with the degree of curvature of a pair of substantially semicircular shelves 6, formed on the standards 2. The elliptical orbit through which the mold-blocks travel is completely filled linearly by the blocks. At the curves of the orbit only the lower edges of the mold-blocks contact, while on the tangents of the orbit the flat side faces of the mold-blocks rest close together. Thus while the respective mold-blocks are unconnected they are held to a definite path of movement by the grooves 3 and may be moved through their orbit by pushing them along. Each mold-block comprises a rectangular block 7, which is provided with one or more cylindrical recesses 8. In the present embodiment three recesses are shown, but more or less may be employed as desired. Slidably mounted in the recesses are plungers 9, which have stems 10, projecting through the top of the mold-blocks. The plungers 9 may have any suitable shape of face to give the desired form to one side of the briquet. In the present embodiment the face of the plunger is shown as concave. A rod 11 passes through the upper ends of each plunger-stem and is held from displacement by pins 12.

A drum 13 is mounted on a shaft 14 at the compressing end of the machine, the shaft 14 being mounted in bearings 15, formed on the standard 16, and the shaft is concentric with the curve of the orbit at the adjacent end of the machine. The diameter of the drum 13 is such that the concave faces of the mold-blocks rest upon its face in traveling through their orbit, and the face of the drum is provided with concave cavities 17, similar to the concave cavities in the faces of the plungers 9. In the operation of the machine the drum 13 is rotated and the mold-blocks are pushed through their orbit, so that as the mold-blocks pass over the face of the drum the cavities in the drum register with the cavities of the plungers in the mold-blocks, and as each mold-block reaches a definite point in its orbit the plungers are automatically forced toward the drum, thereby compressing the briquet material which had previously been deposited in the mold-blocks and forming the briquet. In order to push the mold-blocks through their orbit, a pair of disks 18 is provided, and each disk has concave notches 19 with rounded corners cut in its periphery. The disks 18 are mounted rigidly on the shaft 14, so that the disks and drum 13 revolve together, and as the disks 18 rotate the notches 19 drop over the trunnions 5 and carry the mold-blocks around the curve of the orbit. The standards 2 are cut away to receive the disks 18, and the width of the disks is less than the length of the trunnions 5 of the mold-blocks. Thus as the ends of the trunnions 5 project beyond the outer faces of the disks 18 into the grooves, the mold-blocks are held from any possible displacement in going around the curve with the drum. As the mold-blocks leave the drum the trunnions 5 engage the full depth of the grooves 3. In moving the mold-blocks around each mold-block is pushed along by the one succeeding it. It is obvious that while the mold-blocks are traversing the tangents of the orbit their contacting flat faces will prevent any possible buckling and that in passing around the curve the mold-blocks are held in position against buckling by the shelves 6, while at the other end of the machine the drum 13 holds the mold-blocks in correct radial position. The ends of the curved shelves 6 are continued somewhat below the tangent, so as to give easy entrance for the mold-blocks to the curve.

In order to supply the mold-blocks with the material, a feeder 20 is provided, which comprises a shell 21, having a hopper 22 and a discharge-spout 23, the mouth of which is arranged to discharge the material upon the upturned mold-blocks as they pass. The feeder 20 is provided with a shaft 24, which carries vanes 25. The vanes 25 are preferably formed in two concavo-convex sections, as shown in Figs. 4 and 6, to secure a large surface area. As the material is fed through the hopper 22 it is carried around by the vanes 25 and discharged through the spout 23 upon the mold-blocks as they travel along, and in order to remove any surplus material from the mold-blocks above what is required for forming the briquets and which should remain in the mold-blocks a rotary brush 26 is provided, under which the mold-blocks pass in their travel, the brush 26 sweeping off the excess of material.

In order to force in the plungers and to press the material to form the briquet, a compressor-platen 27 is provided, which is pivoted on a shaft 28. The compressor-platen 27 has a shoe 29, which is sufficiently long to contact with a gang of three plungers as they arrive at the desired point, and the platen 27 is operated by an eccentric 30 and webbed eccentric-rods 31. The eccentric 30 consists of a pair of disks 33, rigidly attached to the shaft 32 concentric therewith and between which is bolted an eccentric-cylinder 34, the latter having a widened longitudinal slot 35, which receives the shaft 32 and which permits the cylinder 34 to be adjusted radially of the shaft, suitable bolts 36 being employed for securing the cylinder 34 and disks 33 together, the disks 33 and cylinder 34 having two or more sets of holes 37 for receiving the bolts. In operation the disks and cylinder revolve together, as they are rigidly connected by the bolts. When it is desired to adjust the cylinder, the bolts may be removed and the cylinder slipped radially of the disks the desired distance. Then the bolts are inserted in another set of registering holes. In the present embodiment sixteen gangs of three cavities are shown in the face of the drum 13, and the shaft 32 is so geared as to operate the eccentric 30 and swing the platen 27 forward sixteen times during a single revolution of the drum, and thereby force in the plungers of a gang when they arrive at a point substantially on a line with the axis of the drum. The shaft 32 is provided with a pinion 38, which meshes with an intermediate gear 39, there being a pinion 40 which revolves with the intermediate gear 39 and which meshes with the gear 41 on the shaft 14. The pulley 42 is mounted on the shaft 14 and is connected by a belt 43 with a pulley 44 on the shaft 24 of the feeder. The shaft of the brush 26 is also provided with a pulley 45, which may be connected by a belt 46 with a pulley 47, also mounted on the shaft 24. As the mold-blocks pass over the drum 13 the plungers of a gang of molds are forced in, thereby compressing the material into briquets, as illustrated in Fig. 6. In order to retrieve the plungers after compression, a pair of curved shelves 48 are provided on each standard 2, upon which the ends of the rods 11 ride as the mold-blocks are pushed along. The shelves 48 are curved eccentrically to the shaft 14, so that the plungers are gradually retracted as the mold-blocks move them along over the shelves, and by the time the mold-blocks have reached the tangent of their orbit, which is their highest point of travel, their plungers are fully retracted. As the plungers are retracted slowly, air works in between the briquet and the plungers, which forms an air-cushion between the briquet and plunger, as the briquet sticks to the mold-block and does not move in farther into the cavity nor drop out. Thus as the briquets are traveling from the drum toward the ejector they are sustained in position in the mold-block, and the plungers are in their retracted position with the intervening air-cushions.

Each standard 2 is provided with a projecting plate 49, having a groove 50, the center of which dips below its ends, as shown in Fig. 6, and the ends of the groove are widened and preferably slightly curved, so as to readily receive the ends of the rods 11. Thus as the mold-blocks are moved along the plungers are gradually depressed as the ends of the rod 11 travel through the grooves 50, and as the plungers gradually move down they compress the air within the mold back of the briquet, and as soon as the rod 11 reaches the lowest point of the grooves 50 the three briquets are popped out by the compressed air, the air-cushions preventing abrasion of the briquets by the plungers, and after being ejected from the mold-block the briquets drop onto a cross-conveyer, which may comprise a belt 51, carried on a pulley 52, suspended by brackets 53. Further movement of the mold-blocks causes the plungers to again be retracted to their original position, the ends of the rods 11 being fully raised by the time they leave the rear ends of the grooves 50.

While I have shown and described the preferred embodiment of my invention, it should be understood that various changes and modifications may be made therein without departing from the spirit of the invention. For instance, the mold-blocks may be driven intermittently by gears 60, which mesh with teeth 61, formed on the mold-blocks, there being a ratchet 62 for rotating the gears, which is driven by a dog 63 on the end of a pivoted lever 64, the latter being rocked by a crank 65 and pitman 66, as shown in Fig. 12.

What I claim is—

1. A series of unconnected mold-blocks, each block having a plurality of cavities, plungers in the cavities, means for moving the mold-blocks through a definite orbit, means coacting with the plungers for compressing briquet material, and means for simultaneously operating the gang of plungers in a mold-block.

2. A series of unconnected mold-blocks, each block having a plurality of cavities, plungers in the cavities, a molding-drum, means for moving the mold-blocks successively in a definite orbit and over the face of the drum, and means for simultaneously operating the respective plungers of a block.

3. A series of mold-blocks, each block having a plurality of cavities, plungers in the cavities, a molding-drum, means for moving the mold-blocks successively in a definite orbit and over the face of the drum, means for pressing the respective plungers of a mold-block simultaneously toward the drum to compress the briquet, means for then retracting the plungers, and means for subsequently pressing in the plungers to expel the briquet.

4. A series of independent mold-blocks, each block having a plurality of cavities, plungers in the cavities, a molding-drum, means for moving the mold-blocks successively in a definite orbit and over the face of the drum, means for pressing the respective plungers of a mold-block simultaneously toward the drum, and means for gradually and positively retracting the plungers.

5. A series of independent mold-blocks, a plunger in a mold-block, a molding-drum, means for moving the mold-blocks over the face of the drum, means for pressing the plunger of a mold-block toward the drum, and means for gradually retracting the plunger to form an air-cushion back of the briquet.

6. A series of mold-blocks, a plunger in a mold-block, a molding-drum, means for moving the mold-blocks over the face of the drum, means for pressing the plunger of a mold-block toward the drum, means for gradually retracting the plunger to form an air-cushion back of the briquet, and means for again pressing the plunger outward and compress the air, thereby ejecting the briquet.

7. A series of mold-blocks, a plunger in a mold-block, a molding-drum, means for moving the mold-blocks over the face of the drum, means for pressing the plunger of a mold-block toward the drum, means for gradually retracting the plunger to form an air-cushion back of the briquet, means for again pressing the plunger outward and compress the air, thereby ejecting the briquet, and a suitable conveyer for receiving the ejected briquets.

8. A series of mold-blocks, a plunger in a mold-block, a molding-drum, means for moving the mold-blocks over the face of the drum, means for pressing the plunger of a mold-block toward the drum, and means for gradually retracting the plunger to form an air-cushion back of the briquet, means for again pressing the plunger outward to compress the cushion, thereby ejecting the briquet, and means for feeding material to the mold-blocks.

9. A series of mold-blocks, a plunger in a mold-block, a molding-drum, means for moving the mold-blocks over the face of the drum, means for pressing the plunger of a mold-block toward the drum, means for gradually retracting the plunger to form an air-cushion back of the briquet, means for again pressing the plunger outward to compress the cushion, thereby ejecting the briquet, means for feeding material to the mold-blocks, and a suitable conveyer for receiving the ejected briquets.

10. A series of mold-blocks, a plunger in a mold-block, a molding-drum, means for moving the mold-blocks over the face of the drum, means for pressing the plunger of a mold-block toward the drum, and means for gradually and positively retracting the plunger and forming an air-cushion back of the briquet.

11. A series of mold-blocks, a plunger in a mold-block, a molding-drum, means for moving the mold-blocks over the face of the drum, means for pressing the plunger of a mold-block toward the drum, and means for gradually retracting the plunger and forming an air-cushion back of the briquet, means for again pressing the plunger outward and ejecting the briquet, and means for then retracting the plunger.

12. A series of mold-blocks, a plunger in a mold-block, a molding-drum, means for moving the mold-blocks over the face of the drum, means for pressing the plunger of a mold-block toward the drum, means for gradually retracting the plunger and forming an air-cushion back of the briquet, means for again pressing the plunger outward and ejecting the briquet, and means for then positively retracting the plunger.

13. A series of mold-blocks, a plurality of rigidly-connected plungers in each mold-block, a pair of standards, having grooves, projections on the mold-blocks engaging the grooves, and means for pushing the mold-blocks along, and means for operating the plungers.

14. A series of mold-blocks, a plurality of rigidly-connected plungers in each mold-block, a pair of standards, each standard having an endless groove, trunnions on the mold-blocks engaging in the grooves, means for pushing the mold-blocks along, and means for operating the plungers.

15. A series of mold-blocks, a plurality of rigidly-connected plungers in each mold-block, a pair of standards, each standard having an endless groove, projections on the mold-blocks lying in the grooves, a pair of rotating devices having notches for engaging the projection of the mold-blocks for pushing the mold-blocks along, and means for operating the plungers.

16. A pair of standards, each standard having a groove, a series of mold-blocks, projections on the mold-blocks engaging the grooves, a shaft, a molding-drum on the shaft, a pair of disks on the shaft having notched peripheries for engaging the projections on the mold-blocks, plungers in the mold-blocks, and means for pressing the plungers toward the drum.

17. A pair of standards, each standard having an endless groove, a shelf on a standard curved concentrically with the grooves, a series of mold-blocks, projections on the mold-blocks engaging the grooves, the face of a mold-block having at least two prominent points for riding upon the curved shelf to prevent the mold-blocks from buckling.

18. A pair of standards, each standard having an endless groove, a pair of shelves on the standards concentric with the curve of the grooves, a series of mold-blocks, projections on the mold-blocks engaging in the grooves, the mold-blocks having concave faces which ride over the curved shelves.

19. A series of mold-blocks, means for moving the mold-blocks through a definite orbit, a gang of plungers in each mold-block, a pivoted platen for consecutively pressing in gangs of plungers, means for rocking the platen, and means for adjusting the length of stroke of the platen.

20. A series of mold-blocks, means for moving the mold-blocks through a definite orbit, plungers in the mold-blocks, a pivoted platen for pressing in the plungers, means for rocking the platen, and means for adjusting the length of stroke of the platen.

21. A series of mold-blocks, means for moving the mold-blocks through a definite orbit, a plurality of plungers in each mold-block, a pivoted platen for bearing against the plungers in a mold-block, and means for rocking the platen.

22. A series of mold-blocks, means for moving the mold-blocks through a definite orbit, plungers in the mold-blocks, a pivoted platen for pushing the plungers, a shaft, an eccentric on the shaft, and a connection from the eccentric to the platen.

23. A series of mold-blocks, means for moving the mold-blocks through a definite orbit, plungers in the mold-blocks, a pivoted platen for pushing the plungers, a shaft, an eccentric on the shaft, and a connection from the eccentric to the platen, said eccentric comprising a pair of rigid disks on the shaft, a cylinder having a widened slot which receives the shaft, and bolts passing through the disks and cylinder.

24. A series of mold-blocks, means for moving the mold-blocks through a definite orbit, plungers, in the mold-blocks, a pivoted platen for pushing the plungers, a shaft, an eccentric on the shaft, a connection from the eccentric to the platen, and means for adjusting the throw of the eccentric.

In testimony whereof I have signed my name to this specification, in the presence of two subscribing witnesses, at Los Angeles, in the county of Los Angeles and State of California, this 25th day of May, 1904.

HOWARD E. MARSH.

Witnesses:
    GEORGE T. HACKLEY,
    JULIA TOWNSEND.